३,५५५,६५३
REMOTE-MANIPULATION TOOL
Marcel Bergeret, Pierre-Benite, Louis Borrel, Hermillon, and Marius Simeone, Pierre-Benite, France, assignors to Commissariat a l'Energie Atomique, Paris, France
Filed May 8, 1968, Ser. No. 727,475
Claims priority, application France, May 24, 1967, 107,724
Int. Cl. B23p 19/04; B23q 7/10
U.S. Cl. 29—211
3 Claims

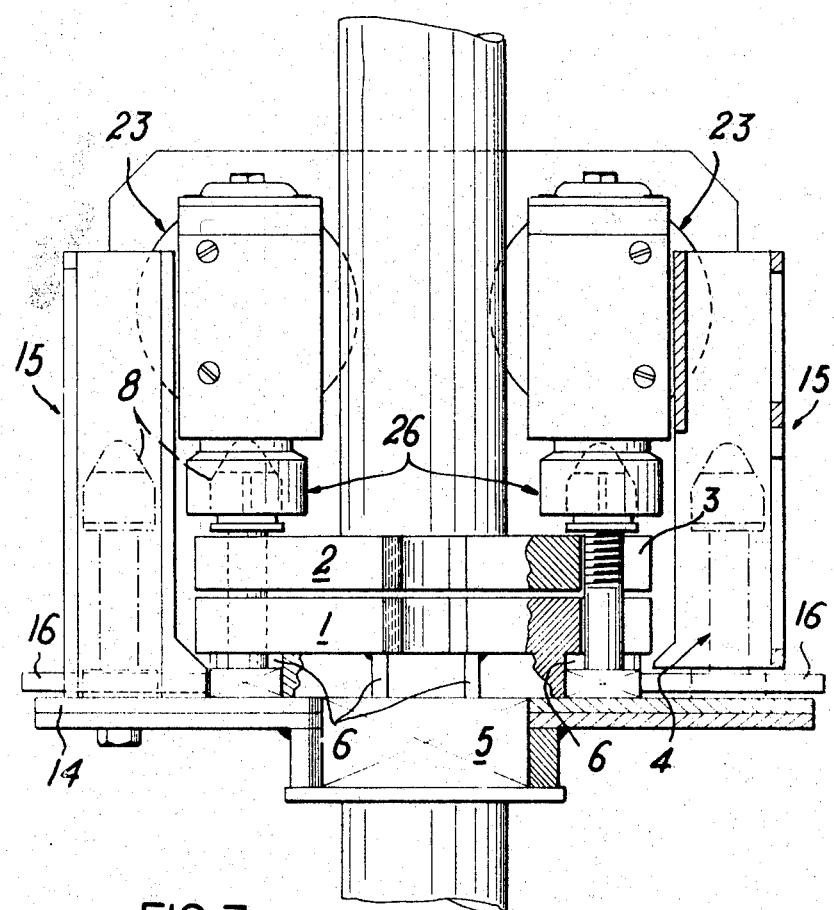

ABSTRACT OF THE DISCLOSURE

A remote-manipulation tool whereby two diametrically opposite fastening bolts of two cooperating flanges may be simultaneously positioned then tightened or slackened, comprising a frame provided with slideways for its setting on said flanges, two magazines in which said bolts are placed one above the other, two ejector levers for causing the lowermost bolt of each magazine to slide towards two diametrically opposite recesses of said flanges and two identical pivotal and remotely operable arms each provided at one end with a screwing head driven by a motor and adapted to engage over the nut of each bolt.

---

This invention is concerned with a remote-manipulation tool which is so designed that two diametrically opposite fastening bolts of two coupling flanges as described in French Pat. No. 107,724 of May 24, 1967 in respect of "Remote-Manipulation Assembly Device," can be first positioned then tightened or slackened at the same time without any direct intervention on the part of an operator.

Flange connections of the type considered are provided for the purpose of assembling the elements of a hot cell for the dry reprocessing of irradiated fuels derived from nuclear reactors and cannot be tightened or slackened manually by reason of the high intensity of emitted radiation. Recourse must therefore be had to a remote-manipulation tool which conforms to the method adopted by an operator when making use of a spanner.

More specifically, the present invention is concerned with a remote-manipulation tool whereby two diametrically opposite fastening bolts of two cooperating flanges provided with radial recesses for the insertion of said bolts may be simultaneously positioned then tightened or slackened, one of said flanges being associated with a guide for positioning said tool. Said tool essentially comprises a frame provided with slideways which are adapted to engage around said guide, two magazines in which said bolts are placed one above the other and comprising an opening for the insertion of the lowermost bolt, two ejector levers for causing the lowermost bolt of each magazine to slide towards two diametrically opposite recesses of the flanges, two identical pivotal and remotely operable arms each provided at one end with a screwing head driven by a motor and adapted to engage over the nut of each bolt and safety systems for preventing in particular the ejection of the bolts and the operation of the driving motors if the tool is not correctly positioned over the flanges.

Further properties and advantages of the present invention will become apparent from the following description which is given with reference to the accompanying drawings and which gives by way of non-limitative explanation one form of construction of said tool in the case of flanges which are fitted with four fastening bolts.

Figure 1:
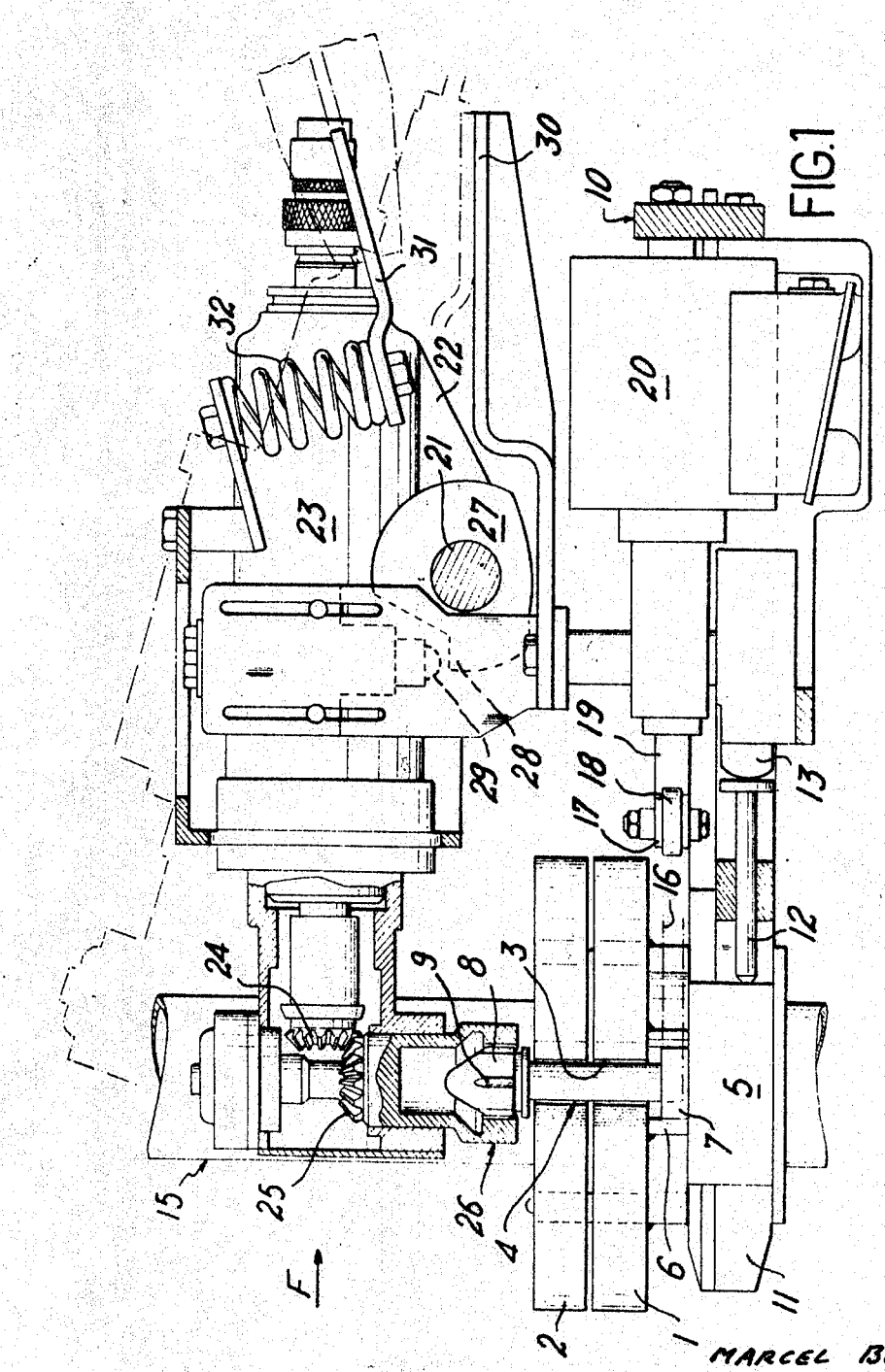
Figure 2:
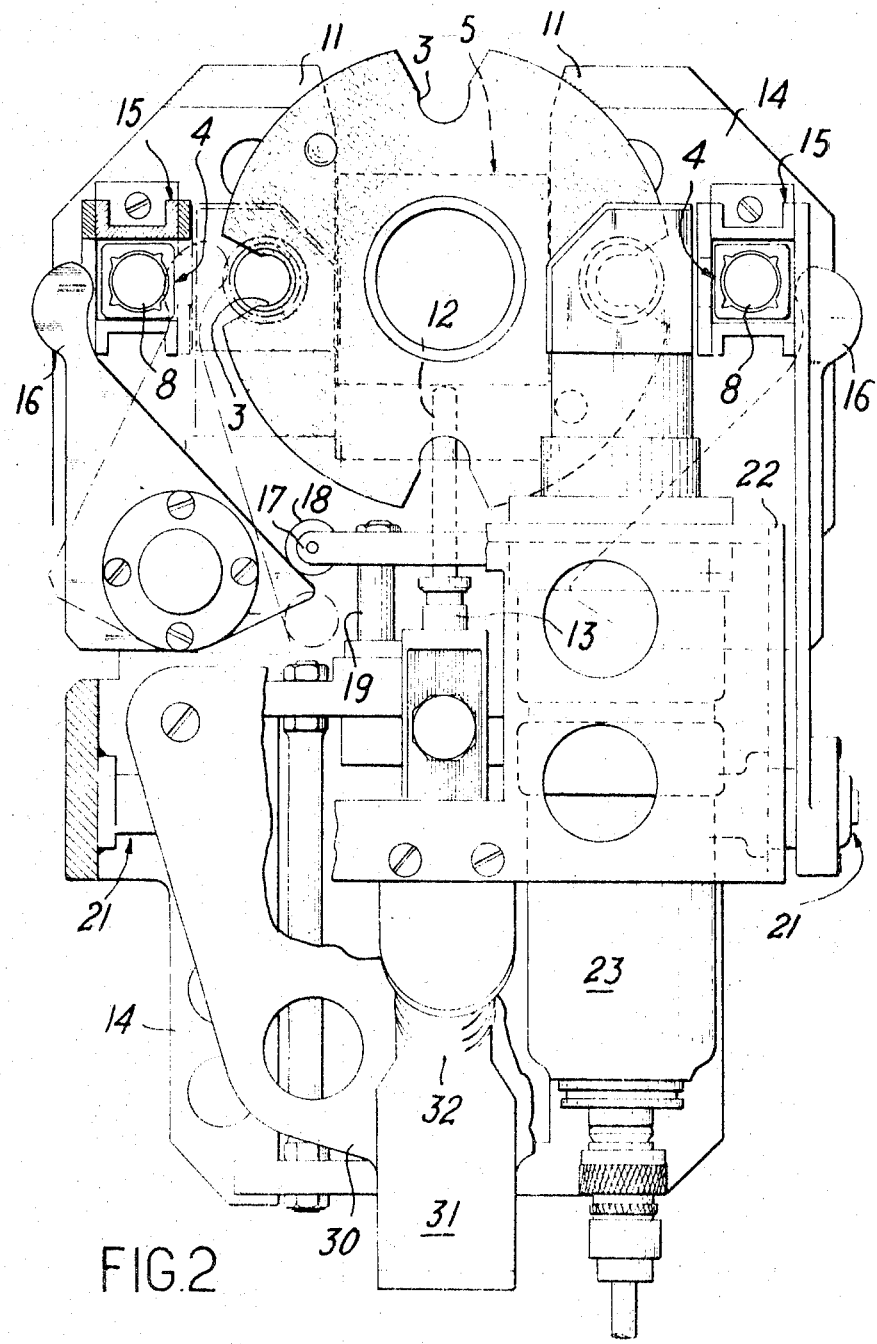

In these drawings:
FIG. 1 is a front sectional view of the tool,
FIG. 2 is a top view of the tool, and finally,
FIG. 3 is a partial view of the tool looking in the direction of the arrow F.

In these figures, the two cooperating flanges to be assembled are shown diagrammatically at 1 and 2. Said flanges are provided with four recesses 3 which are open laterally to permit the insertion of four fastening bolts 4, said recesses being located in diametrically opposite relation. The lower flange 1 is rigidly fixed on the one hand to a square-shaped member 5 and on the other hand to fins 6 which are disposed beneath the recesses 3 on each side of these latter. Said fins are intended to prevent the square head 7 of each fastening bolt 4 from rotating during the tightening operation. Said bolts have a set nut 8 which is provided with male splines 9.

The tool according to the invention which permits remote clamping and releasing of said flanges comprises a frame 10 which is provided with two slidewals 11 and which is adapted to engage around the square 5 of the lower flange 1. A contact pin 12 which is applied against the square 5 is adapted to produce action on a safety microswitch 13. There are attached to the slideways 11 two horizontal platforms 14 on which are placed two bolt loaders 15 designed in the form of vertical magazines in which the bolts 4 are placed one above the other. Said loaders are provided with an opening through which the lowermost bolt is permitted to pass.

The tool also comprises two ejector levers 16 of substantially triangular shape and capable of moving about vertical shafts which are rigidly fixed to the frame 10. As a result of pivotal motion about said shafts, said ejector levers cause the bolts to move towards the recesses 3 of the flanges in which said bolts are intended to be placed. Each ejector is operated by means of an arm 17 fitted at one end with a runner-wheel 18 which is in contact with said ejectors. Said arms are actuated by a traction bar 19 which is driven by an electromagnet 20.

A horizontal shaft 21 is rigidly coupled to the frame 10 and two identical arms 22 are pivotally mounted on said shaft. Said arms are each adapted to carry an electric motor 23 and a pinion 24 which is driven in rotation by said motor and which produces action by means of a second pinion 25 on the screwing head 26 of the nut 8. A contact cam 27 which is rigidly fixed in common movement with the arms 22 produces action by means of a shoulder 28 on a stationary safety microswitch 29.

Finally, the tool comprises a lifting plate 30 which is rigidly fixed to the frame 10 as well as a lifting bar 31 which is intended to be actuated in order to cause the pivotal motion of the arms 22, provision being made for a spring 32 which ensures flexibility of the articulation.

The operation of the tool according to the invention is as follows:

The lifting plate 30 is gripped by means of the remote manipulator and the tool is thus brought into the operative position against the flanges to be assembled in such a manner that the slideways 11 engage around the square member 5 of the lower flange 1.

The circuit for the supply of current to the electromagnet 20 remains open by virtue of the two safety microswitches 13 and 29 as long as the tool is not correctly positioned and as long as the screwing heads 26 are not lifted. When these conditions are satisfied, the electromagnet 20 which actuates the ejectors 16 can accordingly be energized. Said ejectors are applied against the heads of the lowermost bolts of the loaders 15 and cause said bolts to slide along the platforms 14 into the flange recesses 3 which are intended to receive them. When the two bolts 4 have been positioned within opposite flange-recesses and the square heads 7 thereof are locked in position by the fins 6 of the lower flange 1, the lifting bar 31 is remotely actuated so as to cause the complete assembly of the screwing heads 26 and their driving motors 23 to pivot about the horizontal shaft 21 until said heads each engage over the corresponding nut 8. At this moment, the shoulder 28 of the cam 27 is no longer in contact with the microswitch and the circuit for supplying current to the motors 23 which drive the screwing heads 26 can accordingly be closed.

Torque-limiting devices are fitted on said motors in order to stop these latter when the clamping couple attains a predetermined value which can be varied. These devices provide for two successive thresholds for tightening the bolts in two stages.

When the first tightening stage is reached in respect of two opposite bolts, the screwing heads are lifted and the tool is displaced opposite two other flange-recesses 3 in order that the two other bolts which are located opposite to each other may also be brought to the same tightening threshold.

When all the bolts have been brought to the same tightening threshold, the tool is again displaced so as to apply final tightening to all the bolts. The two flanges are thus clamped together in precisely vertical and opposite relation, which is necessary in order to ensure leak-tight assembly.

At the time of disassembly, the tool is moved over the bolts in the same manner as for assembly and the motors are actuated in the opposite direction. After slackening-off, the tool is removed; by means of a remote-control manipulator, it is then an easy matter to drop the bolts and to collect them subsequently.

The initiation of the different operations of the ejector levers and motors is controlled by means of push-buttons located on a control desk on which the progress of operations may be followed by means of ammeters.

It is to be understood that the present invention is not limited to the single form of construction which has been illustrated and described by way of explanation and the scope of this patent also extends to alternative forms of all or part of the arrangements described which remain within the definition of equivalent means as well as to any application of such arrangements. In particular, reference has been made in the above description to flanges comprising four fastening bolts; the guide for positioning the tool 5 is therefore of square shape and the two slideways 11 must be engaged around said guide. However, it is apparent that, in the case of flanges comprising $2n$ fastening bolts, the positioning guide will then be a polygon having $2n$ sides and said slideways must have a shape which is compatible with that of said polygon.

What we claim is:

1. A remote manipulation tool whereby two diametrically opposite fastening bolts of two cooperating flanges provided with radial recesses for the insertion of said bolts may be simultaneously positioned then tightened or slackened, one of said flanges being associated with a guide for positioning said tool, comprising a frame provided with slideways which are adapted to engage around said guide, two magazines in which said bolts are placed one above the other and comprising an opening for the insertion of the lowermost bolt, two ejector levers for causing the lowermost bolt of each magazine to slide towards two diametrically opposite recesses of said flanges, two identical pivotal and remotely-operable arms each provided at one end with a screwing head driven by a motor and adapted to engage over the nut of each bolt and safety systems for preventing in particular the ejection of the bolts and the operation of the driving motors if said tool is not correctly positioned over said flanges.

2. A remote-manipulation tool according to claim 1, wherein said ejector levers are constituted by substantially triangular plates which are capable of moving about a shaft which is rigidly fixed to the frame, said levers being operated by means of a system which is driven by an electromagnet.

3. A remote-manipulation tool according to claim 1, wherein said motors for driving the screwing heads are direct-current motors fitted with torque-limiting devices.

References Cited

UNITED STATES PATENTS

| | | | |
|---|---|---|---|
| 2,993,218 | 7/1961 | Devlin | 10—155 |
| 3,099,075 | 7/1963 | McDaniels, Jr., et al. | 29—240 |
| 3,382,559 | 5/1968 | Kopec et al. | 29—240 |
| 3,456,326 | 7/1969 | Batten | 29—211 |

THOMAS H. EAGER, Primary Examiner

U.S. Cl. X.R.

29—240